(12) United States Patent
Bhagavatha et al.

(10) Patent No.: US 12,165,142 B2
(45) Date of Patent: Dec. 10, 2024

(54) FORK-TOLERANT CONSENSUS PROTOCOL

(71) Applicant: Storecoin Inc., Walnut, CA (US)

(72) Inventors: Raghavendra Kidiyoor Bhagavatha, San Jose, CA (US); Christopher Andrew McCoy, San Francisco, CA (US)

(*) Notice: Subject to any disclaimer, the term of this patent is extended or adjusted under 35 U.S.C. 154(b) by 602 days.

(21) Appl. No.: 17/362,697

(22) Filed: Jun. 29, 2021

(65) Prior Publication Data

US 2021/0326867 A1 Oct. 21, 2021

Related U.S. Application Data

(62) Division of application No. 16/378,456, filed on Apr. 8, 2019, now Pat. No. 11,080,691.

(60) Provisional application No. 62/655,175, filed on Apr. 9, 2018.

(51) Int. Cl.
 *G06F 21/00* (2013.01)
 *G06Q 20/38* (2012.01)
 *H04L 29/06* (2006.01)

(52) U.S. Cl.
 CPC ..... *G06Q 20/3825* (2013.01); *G06Q 20/3827* (2013.01); *G06Q 20/3829* (2013.01); *G06Q 20/389* (2013.01); *G06Q 2220/00* (2013.01)

(58) Field of Classification Search
 None
 See application file for complete search history.

(56) References Cited

U.S. PATENT DOCUMENTS

| | | | | |
|---|---|---|---|---|
| 7,124,110 | B1* | 10/2006 | Kemp, II | G06Q 40/04 |
| | | | | 705/37 |
| 2016/0150060 | A1* | 5/2016 | Meng | H04L 67/10 |
| | | | | 709/223 |
| 2016/0224949 | A1* | 8/2016 | Thomas | G06Q 20/02 |
| 2016/0330034 | A1* | 11/2016 | Back | G06Q 20/065 |
| 2017/0132626 | A1* | 5/2017 | Kennedy | G06Q 20/065 |
| 2017/0236120 | A1* | 8/2017 | Herlihy | G06Q 20/065 |
| | | | | 705/67 |
| 2018/0137512 | A1* | 5/2018 | Georgiadis | H04L 63/08 |
| 2018/0329945 | A1* | 11/2018 | Horii | G06F 16/2379 |
| 2019/0228086 | A1* | 7/2019 | Bordens | G06F 16/219 |

OTHER PUBLICATIONS

Hoops, J.F., "An introduction to Public and Private Distributed Ledgers," Seminars FI/IITM SS 17, Network Architectures and Services, Sep. 2017, pp. 41-48.

(Continued)

*Primary Examiner* — Lisa C Lewis
(74) *Attorney, Agent, or Firm* — Fenwick & West LLP

(57) ABSTRACT

A consensus network includes Messagenodes and Validators. The Messagenodes add transactions to pre-built blocks of a blockchain. The Validators validate the transactions added to the blocks by the Messagenodes. Validators individually sign blocks in a pre-commit phase and if a block receives a threshold number of signatures, the Validators verify the signatures in a counting phase and commit the block to the blockchain. When a block is committed, it is linked to the previous sealed block in the blockchain.

20 Claims, 9 Drawing Sheets

(56) References Cited

OTHER PUBLICATIONS

Interchain Foundation, "Tendermint in a Nutshell," Cosmos, Jun. 21, 2017, 1 page [Online] [Retrieved May 29, 2019], Retrieved from the internet <URL: https://blog.cosmos.network/tendermint-in-a-nutshell-39d9f7f66ad-7>.
Kwon, J., "Tendermint: Consensus without Mining," Fall 2014, pp. 1-11.
Miller, A. et al., "The Honey Badger of BFT Protocols," CCS '16, Oct. 24, 2016, pp. 31-42.
PCT International Search Report and Written Opinion, PCT Application No. PCT/US2019/026513, dated Jul. 24, 2019, 20 pages.
Tsai, W.T. et al., "Design Issues in Permissioned Blockchains for Trusted Computing," IEEE Symposium on Service-Oriented System Engineering, Apr. 2017, pp. 153-159.
United States Office Action, U.S. Appl. No. 16/378,456, filed Feb. 10, 2021, 17 pages.

* cited by examiner

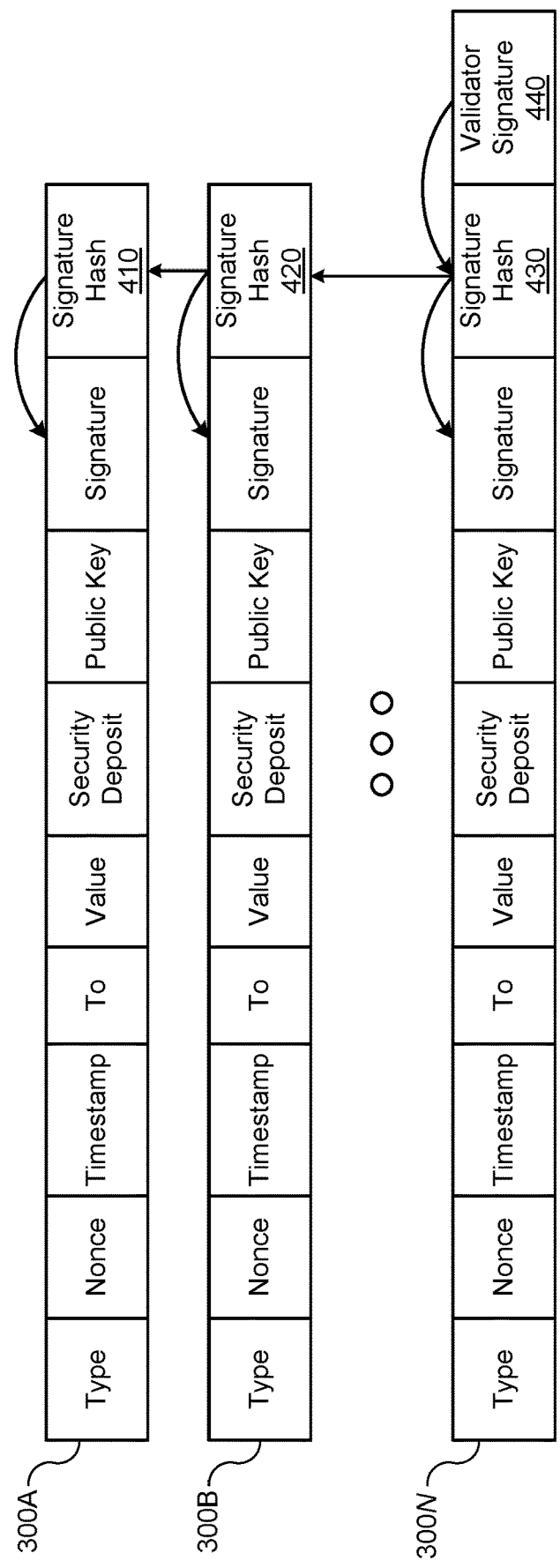

FORK-TOLERANT CONSENSUS PROTOCOL

CROSS REFERENCE TO RELATED APPLICATIONS

This application is a divisional of U.S. patent application Ser. No. 16/378,456, filed Apr. 8, 2019, which claims the benefit of U.S. Provisional Application No. 62/655,175, filed Apr. 9, 2018, both of which are incorporated by reference.

BACKGROUND

1. Technical Field

The subject matter described generally relates to distributed ledgers, and in particular to a fork-tolerant consensus protocol for building a blockchain.

2. Background Information

Distributed ledgers were developed as a means for parties to engage in transactions, e.g., financial transactions, without the need for a single, trusted intermediary. In such systems, each transaction is recorded independently by several nodes (e.g., on a blockchain). No one entity controls all of the nodes so it is exceedingly difficult for a malicious actor to alter the transaction once it has been recorded by the nodes. Accordingly, the transactions can be conducted without the parties needing to trust each other, or any individual node provider.

More precisely, the participating nodes (who may not trust each other) can reach consensus and cooperate without a third party or a central authority. However, the decentralization used to replace individual trust typically involves the participation of a large number of diverse participants, impacting the throughput of the blockchain. Thus, practical deployments of blockchain networks have typically been faced with a choice between throughput and trust.

Another problem that arises with blockchains is relates to chain forks. In the blockchain, a miner or proposer releases the new block into the blockchain, but it takes some time before the producers converge on the longest chain. This results in chain forks and it is possible that a block released by a producer does not make it to the main chain at all, if that block is not harvested off the longest chain. Such orphaned blocks are either discarded or included in the chain to improve the security of the main chain. Either way, the transactions included in the orphaned blocks are ignored, thus wasting the block producer's time and effort in validating and including the transactions into those blocks. This wasteful computation happens in every round, especially when a large number of producers release new blocks concurrently. The very catalyst for decentralization contributes to this waste. While a large number of producers can create new blocks, only one of them will succeed in getting its block added to the main chain, thus severely limiting the blockchain throughput.

BRIEF DESCRIPTION OF THE DRAWINGS

FIG. 3A illustrates the structure of a transaction message, according to one example embodiment.

FIG. 3B illustrates a batch of transaction messages, according to one example embodiment.

DETAILED DESCRIPTION

Figure 1:
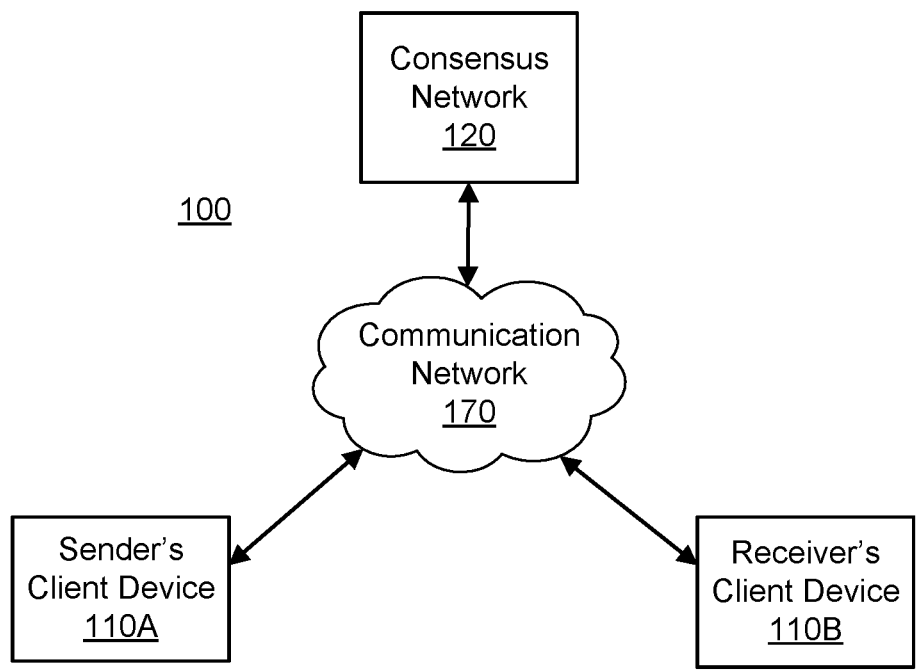
FIG. 1 is a block diagram illustrating a networked computing environment suitable for implementing a fork-tolerant consensus protocol, according to one example embodiment.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality. Also, where similar elements are identified by a reference number followed by a letter, a reference to the number alone in the description that follows may refer to all such elements, any one such element, or any combination of such elements.

Overview

In various example embodiments, a consensus network uses a leaderless, asynchronous, probabilistic Byzantine consensus protocol to maintain a distributed ledger (e.g., a blockchain). The term blockchain is used herein for convenience but one of skill in the art will understand that other forms of distributed ledger may be used. Similarly, the term hash is used for convenience, but some embodiments may use other forms of reduced representation. The blockchain may be used to process and maintain a record of transactions (e.g., financial transactions) between users. By using a pipelined and parallelized approach for reaching consensus, the consensus network may achieve high scalability while maintaining high decentralization in the form of number of active processes participating in the consensus.

In one embodiment, a Messagenode receives transaction batches and broadcasts a message in the consensus network identifying the received transaction batches and a target block in a blockchain. The Messagenode receives a number of acknowledgments of the message by other Messagenodes and transmits an accept request if the number of acknowledgments exceeds an acknowledgment threshold. The Messagenode receives accepted messages from other Messagenodes of the consensus network and selects the transaction batches to be written to the target block if the number of accepted messages exceeds an acceptance threshold.

In another embodiment, a Validator receives transaction messages for a predetermined time period and adds the received transaction messages to the Validator's queue. The Validator appends a reduced representation (e.g., a hash) of a transaction signature of a first transaction message in the validator queue to the first transaction message and adds the first transaction message to a transaction batch. For at least one additional transaction message in the validator queue, the Validator combines a reduced representation corresponding to a previous transaction in the validator queue and a transaction signature of the additional transaction message. The validator generates a reduced representation from the combination, appends the generated reduced representation as an additional field in the additional transaction message, and adds the additional transaction message to the transaction batch. The Validator also signs the last transaction in the batch and sends the batch to one or more Messagenodes of the consensus network. Batching the transactions may reduce the communications overhead between Validators and Messagenodes. The appended reduced representations may ensure (or at least provide a high level of confidence in) the integrity of the batch, which allows Messagenodes to treat the batches as "black boxes."

In a further embodiment, a Validator retrieves transactions corresponding to reduced representations (e.g., transaction hashes) included in a distributed ledger (e.g., in a block of a blockchain) and performs validation tests on at least some (e.g., all) of the transactions. Based on the validation tests, the Validator applies a pre-commit signature to the block in conjunction with an indication of whether the pre-commit signature is conditional or unconditional. The pre-commit signature may be unconditional if the Validator successfully validates all of the transactions in the batch and conditional otherwise. The Validator also records a public verification key in conjunction with the block Although the terms "distributed ledger" and "blockchain" are used in discussion of various embodiments below, one of skill in the art will recognize that other forms of distributed storage, such as a distributed database, may be used without departing from the spirit or scope of what is disclosed. Thus, references to distributed ledgers and blockchains should be considered to encompass these other forms of distributed storage.

Example Systems

FIG. 1 illustrates one embodiment of a networked computing environment 100 suitable for implementing a fork-tolerant consensus protocol. In the embodiment shown in FIG. 1, the networked computing environment 100 includes a sender's client device 110A, a receiver's client device 110B, and a consensus network 120, connected via a communication network 170. In other embodiments, the networked computing environment 100 may contain different and/or additional elements. In addition, the functions may be distributed among the elements in a different manner than described. It is noted that reference to a sender and/or a receiver may also be in the context of computing communications (e.g., sent and/or received data) from their respective computing devices, as further described herein.

The client devices 110 are computing devices capable of receiving user input as well as transmitting and/or receiving data via the communication network 170. A client device 110 may be a computer system, such as a desktop or laptop computer. Alternatively, a client device 110 may be a device having computer functionality, such as a personal digital assistant (PDA), a mobile telephone, a smartphone, a set-top box, a smart home device, or another suitable device. These devices may have, for example, some or all of the components as described with FIG. 10. In addition, the network 170 may be wired and/or wireless networks, for example, that may include the Internet, to peer-to-peer networks and/or mobile (or cellular) networks.

Although FIG. 1 shows just one sender's client device 110A and one receiver's client device 110B, in practice many (e.g., thousands or even millions of) client devices 110 may interact with the consensus network 120. Also, a client device 110 may be both a sender's client device 110A and a receiver's client device 110B.

In one embodiment, a client device 110 executes software (e.g., an application) allowing a user of the client device 110 to interact with the consensus network 120. For example, the sender's client device 110A may execute a transaction application that enables the sender to transfer value from the seller's account to a receiver's account via the client device 110A. The sender's client device 110A sends a transaction message to the consensus network 120 indicating the desired recipient and a value to transfer. Assuming the consensus network 120 approves the transaction, the value is transferred from the seller's account to the receiver's account. The receiver's client device 110B may be sent a notification of the transferred value. Additionally or alternatively, the receiver's client device 110B may execute software (e.g., the transaction application, a browser, etc.) with which the receiver may view information such as the receiver's account balance, transaction details, and the like.

The consensus network 120 receives transactions from client devices 110 and uses the fork-tolerant consensus protocol to process the transactions. The consensus network 120 uses a distributed ledger (e.g., a blockchain) to maintain a persistent and reliable record of transactions. The consensus network 120 may also store account balances by maintaining a chain of transactions for each account.

Figure 2:
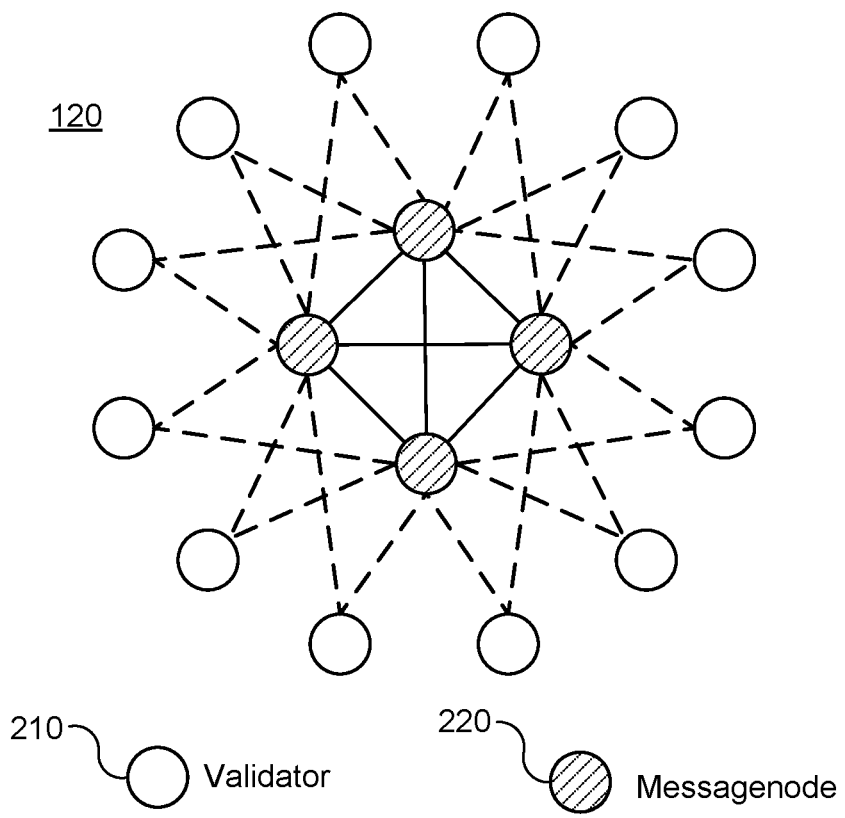
FIG. 2 illustrates the consensus network of FIG. 1, according to one example embodiment.

FIG. 2 illustrates the structure of one example embodiment of the consensus network 120. In the embodiment shown, the consensus network 120 is an overlay network including Validators 210 and Messagenodes 220. The consensus network 120 includes N nodes split into V Validators 210 and M Messagenodes 220 such that N=V+M. $V_c$ are correct Validators and $V_f$ are faulty or Byzantine Validators. Similarly, $M_c$ are correct Messagenodes and $M_f$ are faulty or Byzantine Messagenodes. Generally, there are a large number of Validators 210 and a relatively small number of Messagenodes 220.

The Validators 210 receive transaction messages from senders' client devices 110A. Generally, different Validators 210 will receive different numbers of transaction messages. The Validators 210 do not communicate peer-to-peer (p2p) for consensus purposes (although they may communicate p2p for housekeeping purposes, such as heartbeat, sharing global state, etc.). Rather, each Validator batches the received transactions and forwards the batches to m connected Messagenodes 220, as described in greater detail below, with reference to FIGS. 3 and 6. In the embodiment shown in FIG. 2, each Validator 210 is connected to two Messagenodes 220 (m=2). Thus, any given transaction should be forwarded to two Messagenodes 220 (assuming the Validator 210 if behaving correctly). In other embodiments, Validators 210 may be connected to different numbers of Messagenodes 220. Generally, Validators connect to at least m=$M_f$+1 Messagenodes (e.g., randomly) as this is sufficient to ensure that each transaction batch reaches at least 1 correct Messagenode.

The Messagenodes 220 act as a sink for the transaction batches forwarded by the Validators 210. In contrast to the Validators 210, the Messagenodes 220 exchange messages regarding transactions p2p. In one embodiment, the Messagenodes 220 use a messageboard model. The messageboard supports two operations—read and write. A Messagenode 210 can write messages to the messageboard and read all the messages that have been written to the messageboard (by any Messagenode). The constructs MB_READ (mb_address, topic) and MB_WRITE (mb_address, topic, m), where mb_address is the address of the messageboard, topic is the topic on which the messages are requested or written, and m is the message being written, are used to model the messageboard. MB_READ( ) returns all the messages that have been written to the topic so far. The use of topic allows the messageboard to read from/write to multiple topics at once. No assumption is made on the trustworthiness of the messageboard. Since the read and write operations are asynchronous, the Messagenodes 220 writing to and reading from the messageboard do not assume any order in the messages.

In various embodiments, the messageboard model enables each of the Messagenodes 220 to act as a data sink node. This facilitates division of labor between the two interconnected networks—the Validators 210 receive transaction messages from client devices 110A and send batches of the transaction messages to Messagenodes 220. Note that, in some embodiments, some or all of the transaction batches may be a single transaction. The Messagenodes 220 assemble blocks based on the transaction batches that are in turn validated by the Validators 210. This approach may have various advantageous properties, including:

(1) Reducing the message complexity from quadratic—$O(V^2)$—to a value between $O(V*m*\log M)$ and $O(V*m*M)$ (worst case) where V is the total number of validators, M is the total number of Messagenodes 220, m is the number of Messagenodes connected to each Validator 210, and log M is the number of messages exchanged by the Messagenodes to synchronize the transactions among themselves. This may allow for a larger value of V than is feasible with traditional network designs.

(2) Providing a data hub (the Messagenodes 220) to which the Validators 210 write transaction batches and read the transaction batches that have been written by other nodes.

(3) Preventing the Messagenodes 220 from being able to censor transaction messages without the connected Validator 210 noticing such malicious actions. This addresses the concerns that arise from centralization of the transaction storage functionality to a relatively small number of Messagenodes 220.

(4) Isolating the block creation and validation processes, so it requires >⅓ of the Validators 210 colluding with >⅓ of the Messagenodes 220 to destabilize the consensus process.

FIG. 3A illustrates the structure of one embodiment of a payment transaction message 300. In the embodiment shown, the transaction message 300 includes the following fields: type 310, nonce 320, timestamp 330, to 340, value 350, security deposit 360, a public key 365, and signature 370. Different types of transaction message may include different and/or additional fields. Furthermore, in other embodiments, the payment transaction message 300 may contain different and/or additional fields. In addition, the data may be distributed among the fields in a different manner than described.

The type field 310 indicates the type of transaction represented by the message 300. For example, in one embodiment, the supported transaction types include: TXN_CREATE_ACCOUNT (creates an account with a specified address), TXN_PAYMENT (a default payments transaction), TXN_TOKENIZED_APP (a transaction for a tokenized app), and TXN_TOKENIZED_APP_RESULT (a result transaction produced by the execution of a tokenized app instance). The type field 310 may also include a version number within the indicated type. This enables future enhancements to be made such that multiple versions of a given transaction type can coexist.

The nonce field 320 includes a nonce number that uniquely identifies the transaction among the debit transactions of the sending account. In one embodiment, the nonce number is an integer that starts at zero for the genesis transaction of the sending account and is incremented (e.g., by one) every time a new debit transaction is created for the sending account. Thus, the transactions of the sending account may be ordered based on the nonce numbers. In other embodiments, other methods of generating an identifier for the transaction may be used.

The timestamp field 330 includes a timestamp indicating the time at which the transaction message was created, the to field 340 includes an identifier of the intended receiving account, and the value field 350 includes the intended amount to transfer to the receiving account. The security deposit field 360 indicates an amount to be held as a transaction bond for the transaction. Even in implementations where there is no transaction cost for valid transactions, the security deposit may be used to mitigate distributed denial of service (DDoS) attacks and other malicious behavior (e.g., double spending). The security deposit may be returned to the sender's account once the transaction is deemed valid. In implementations where there is a transaction cost, the security deposit may be partially or completely applied to the transaction cost.

The public key field 365 include the public key of the sender and the signature field 370 includes a digital signature of the sender. In one embodiment, the sender's signature is a hash generated by applying the sender's private key to the content of the other fields 310 through 365 of the transaction message 300. The generated hash is added to the signature field 370 of the transaction message 300. The content of the transaction message 300 may then be verified as unchanged by applying the sender's public key 365 to the sender's signature.

As noted previously, using the messageboard model reduces the message complexity to the consensus process from quadratic to a value between $O(V*m*\log M)$ and $O(V*m*M)$. In some embodiments, the message complexity is further reduced by using a batching process to group transactions at the Validators 210 before forwarding them to the connected Messagenodes 220. The transaction batches may then be treated as a single unit during the consensus process, as described in greater detail below, with reference to FIGS. 5 through 9.

To create a batch, a Validator 210 waits for a predetermined amount of time, A, and batches transactions received in that window before sending the batch to the connected Messagenodes 220. In one embodiment, a default value for A is defined, but each Validator 210 may choose its own value to use based on a typical or expected rate of incoming transaction messages. Regardless of the time period selected, a Validator 210 batches incoming transaction messages by joining them as a chain.

FIG. 3B illustrates the structure of one embodiment transaction message batch. In the embodiment shown, the batch includes several transaction messages 300A-N(N being end of a series or set). If the transactions arrive at a higher rate than the rate at which the batch is produced in the time period, A, the first transaction 300A will be the first transaction in Validator's queue after the last batch. The Validator 210 appends a hash 410 of the first transaction message's signature 370 to the first transaction message 300A.

For subsequent transaction messages (e.g., the second transaction message 300B), Validator 210 appends a hash 420 generated from a combination of the hash of the previous transaction message (e.g., hash 410) and the signature 370 of the current transaction message (e.g., the second transaction message). In one embodiment, the combination is obtained by concatenating the hash of the previous transaction message with the signature 370 of the current transaction message to generate a concatenated string. The hash 420 for the subsequent transaction message may then be generated by hashing the concatenated string. In other embodiments, other combinations may be used.

Once the Validator 210 has appended a hash 430 to the last transaction 300N in the batch, the Validator signs the last transaction. In one embodiment, the Validator 210 signs the last transaction 300N by appending a hash 440 generated by applying a private key to the signature hash 430 of the last transaction. Using this approach, any approach for ordering the transaction 300A-N may be used (so long as the same approach is consistently used across the consensus network). For example, the transactions may be ordered by: time stamp 330, recipient identity 340, value 350, etc. Regardless, the transactions 300A-N are chained so that the Validator 210 can sign the hash 430 of the last transaction 300N, sealing the transaction batch. Thus, the receiving Messagenode 220, for example, cannot censor individual transactions in the batch, because doing so will result in failing the validator signature verification. The transaction batch may then be treated as a single unit during the consensus process. In other embodiments, the Validator 210 may sign the last transaction using other approaches.

The Messagenodes 220 assemble blocks from the received transaction messages. In various embodiments, a chain of empty blocks is created at genesis time. The set of Validators 210 included in the consensus network 120 at genesis time may sign the empty blocks to enable verification of authenticity and integrity of the blocks. The Validators 210 may add (and sign) additional empty blocks at later times as needed. For example, once the number of unfilled blocks drops below a threshold, an additional set of empty blocks may be added. Because the Validators 210 included in the consensus network 120 can change over time, the set of nodes that add new blocks may be different from the set that added the original blocks at genesis time.

The Messagenodes 220 assemble blocks by adding transactions to the previously created empty blocks. Because the blocks have already been created, multiple blocks may be assembled in parallel. Thus, the role of the Messagenodes 220 is to reach consensus regarding which transactions (or batches) are included in which blocks. Various embodiments of this process are described in greater detail below, with reference to FIG. 7.

The Validators 210 validate the assembled blocks generated by the Messagenodes 220. In various embodiments, the Validators 210 perform a two-phase hardening (or validation) process to reach consensus, committing (hardening) the content of the blocks, followed by a sealing process, which creates checkpoints for the hardened blocks. Due to the structure of the consensus network 120 and the use of the fork-tolerant consensus protocol, the Validators 210 need not communicate or otherwise be aware of each other during these processes. These processes are described in greater detail below, with reference to FIGS. 5 through 9.

Figure 4A:
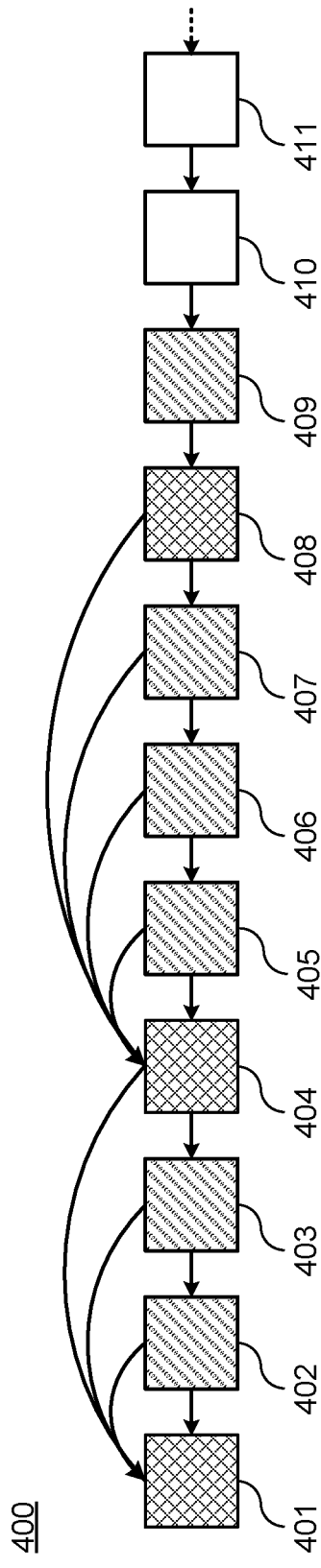
FIG. 4A illustrates a blockchain constructed using the fork-tolerant consensus protocol, according to one example embodiment.

The new blocks being committed link mathematically to the last sealed block, thus creating forks on the last sealed block. FIG. 4A illustrates a blockchain 400 constructed using an embodiment of the fork-tolerant consensus protocol. The genesis block 401 as well as block 404 and block 408 have been sealed. Hardened blocks 402 through 404 are linked to the genesis block 410 (they are forks on the genesis block). When blocks 405 through 408 are committed, they are linked to the previous sealed block 404, and so on. Note that blocks 410 & 411 are still undergoing assembly and/or hardening. Thus, while these blocks are linked to the immediately preceding block, they are not yet linked to the preceding sealed block 408.

In various embodiments, the sealing phase works in batches with the last block in the batch serving as the sealed block to which the next batch of committed blocks will link. This structure may enable parallel assembly of the blocks without throttling their creation. Since the most recently assembled blocks are linked to the last sealed block, they can be validated with reference to the most recently sealed block. The presence of links to both the preceding block (generated when the blocks are initially created) and to the preceding sealed block (generated during sealing) may improve the security of the chain because the different links demonstrate the blocks have been verified in different phases by different entities.

Figure 4B:
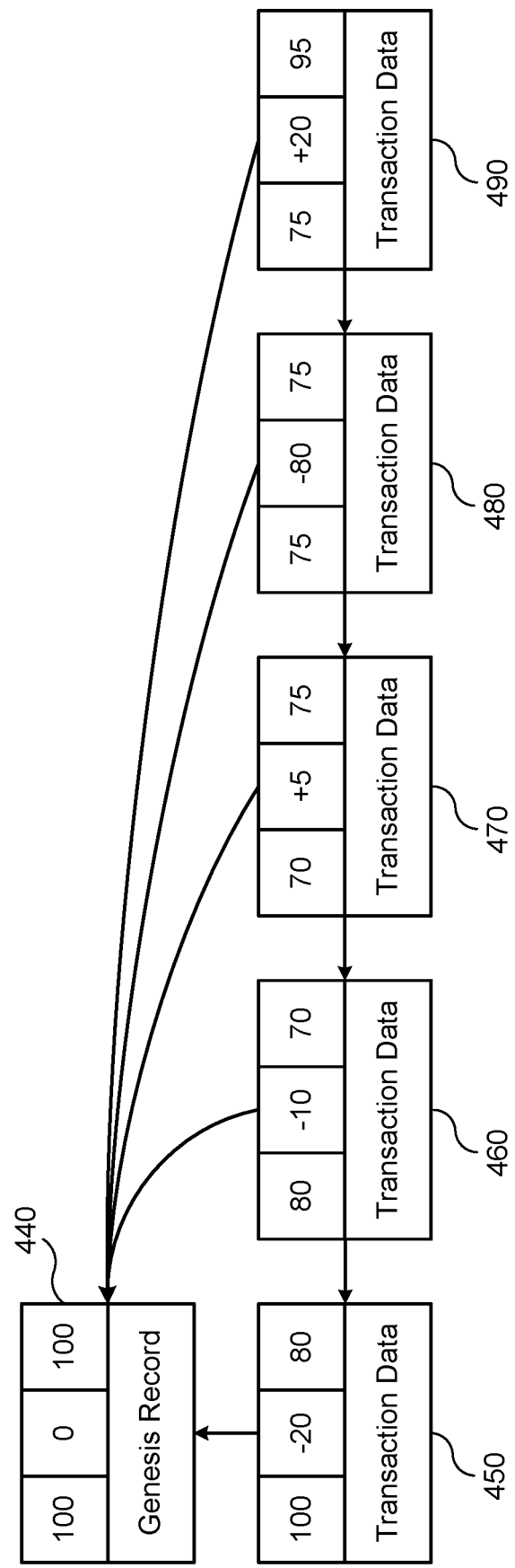
FIG. 4B illustrates a chain of transactions for an account, according to one example embodiment.

To address double spending, some embodiments model accounts using a similar approach to the blockchain. FIG. 4B illustrates an account represented as a chain of transactions, according to such an embodiment. In FIG. 4B, the chain begins with a genesis record 440 which indicates an initial balance of one hundred. Because it is the genesis record 440, there is zero adjustment to the balance, so the resulting balance is also one hundred.

A first transaction 450 indicates an initial balance of one hundred and a debit of twenty, which results in a balance of eighty. The first transaction is linked to the genesis record 440. A second transaction 460 indicates an initial balance of eighty (the resulting balance from the first transaction 450) and a debit of ten, resulting in a balance of seventy. The second transaction 460 is linked to the first transaction 450 to indicate the processing order (which may not necessarily be the order they transactions were submitted to the consensus network 120) as well as the last sealed transaction (in this case, the genesis record 440).

A third transaction 470 indicates a credit of five, increasing the balance from seventy to seventy-five. A fourth transaction 480 attempts to debit eighty from the account, but because the current balance is only seventy-five, this transaction is declined, leaving the balance at seventy-five. The fourth transaction 480 is still included in the chain for the account, and is linked to the genesis record 440, but does not change the balance of the account. A fifth transaction 490 indicates a credit of twenty, which results in a balance of ninety-five. Note that even though the fourth transaction 480 was declined, the fifth transaction 490 still successfully processes.

In one embodiment, when a transaction is sealed, the links of the following transactions are updated so that they link to the newly sealed transaction rather than the transaction that was previously the most recent sealed transaction. In other words, all transactions in an account may be linked to the most recently preceding sealed transaction. The current balance indicated by the sealed transaction is verified, and thus the approval state of the following transactions may be determined from most recently sealed transaction without needing to reference the remainder of the chain.

Example Methods

The methods that are described below are example embodiments that are included to illustrate various features of the consensus network. For clarity and readability, the various steps of the methods are described as being performed by particular entities. However, some or all of the steps may be performed by other entities or components. In addition, some embodiments may perform the steps in parallel, perform the steps in different orders, or perform different steps.

Figure 5:
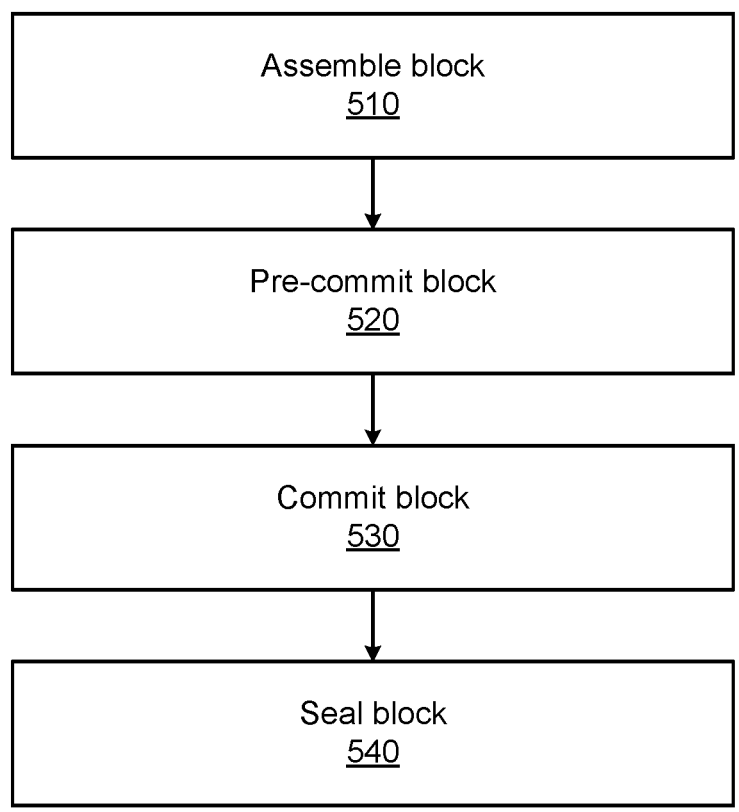
FIG. 5 is a flowchart illustrating a method for building a block using the fork-tolerant consensus protocol, according to one example embodiment.

FIG. 5 illustrates a method 500 for building a block using the fork-tolerant consensus protocol, according to one embodiment. In the example embodiment shown in FIG. 5, an example method 500 begins with the consensus network 120 assembling 510 a block. As described previously, the block may be assembled 510 by adding batches of transactions to a previously formed empty block. Client devices 110 may send transaction messages to any of the Validators 210. In response to receiving a transaction message, a Validator 210 validates the transaction message.

In one embodiment, validating the transaction message includes checking if the transaction message is correctly formatted, checking if the transaction message includes a valid account holder signature, checking if the sender's public key is valid, checking if a valid recipient account is identified, and/or checking if the amount to transfer is correctly formatted. Note that, in this embodiment, transaction message validation does not include more computationally expensive checks such as checking the sender's account balance. In other embodiments, validating the transaction includes different and/or additional checks.

In various embodiments, if the transaction message is validated, the Validator 210 adds the transaction to the sender's account. Recall that transactions in the account form a chain and are linked to the latest sealed transaction, which may provide an up-to-date account balance. The transaction status is determined using the balance (e.g., provisionally approved if sender has an adequate balance or declined otherwise). A link to the latest sealed transaction is added and the block ID to which the transaction is going to be added is recorded. The digest of the resulting transaction message is signed by the receiving Validator 210 and the node's verification (public) key is recorded in the transaction. This adds the new transaction to the set of pending transactions (or starts the set if this is the first transaction after last sealed transaction). The block ID in the transaction links it to the block to which the transaction will be added. Thus, when the block is sealed, the transaction may also be sealed automatically Because the pending transaction set is available in the account, the status of the transaction can be determined at this time. If the transaction is provisionally approved, the approval may not be finalized until the block commits. However, if the transaction is declined, the sender may learn of it instantly. The transaction is also added to the block being assembled (e.g., using the transaction batching process described above, with reference to FIG. 3B). Note that a batch may include a single transaction. Embodiments of the batching process are described in greater detail below, with reference to FIG. 6. Furthermore, because each Validator 210 is generally connected to only a subset of the Messagenodes 220, a consensus algorithm may be used to determine what transactions are added to the block. Embodiments of the consensus algorithm are described in greater detail below, with reference to FIG. 7.

Each empty block has an upper limit on the number of transactions that can be added and this limit can change from block to block depending on the rate of incoming transactions. Thus, when the incoming transaction rate is low, unnecessary waiting for additional transaction messages may be avoided. Note that the transaction limit provides a guideline for the Messagenodes 220 in determining when to stop adding new transactions to a given block. Generally, when a block fills up, the Messagenodes 220 move onto the next empty block. The blocks fill up at a rate proportional to the number of active nodes in the network and the rate at which the they receive transactions. Since multiple Messagenodes 220 may receive the transactions concurrently and assemble them into a given block, it is possible that the limit is exceeded slightly. This is not a violation of the protocol.

In one embodiment, adding a transaction batch to a block includes adding a hash of the batch (e.g., a hash generated by signing the last transaction in the batch) to the block. Since the batch already includes the signature of the Validator 210, it can be added to the block without an additional signature. Once the block has been filled, it is ready for validation. Generally, after assembly 510, a block includes validated transaction batches from multiple Validators 210, and each batch is signed by the corresponding Validator indicating it followed the protocol rules for block assembly.

The Validators 210 pre-commit 520 the block once it has been assembled. Pre-commitment 520 is the first phase of the two-phase hardening process and corresponds to the voting part of "voting and counting." In various embodiments, active Validators 210 participate in validating assembled blocks. No leader or delegation is selected. Each active Validator 210 performs a series of tests to determine whether each transaction in an assembled block is valid and signs the block. The signature can either be unconditional (if all transactions pass all tests) or conditional (if at least one transaction failed at least one test). The Validator 210 may store an indication of which transaction or transactions failed the tests. Note that the block as a whole is always signed (approved), so any valid transactions included in the block may still be finalized and are not disrupted by any invalid transactions that happen to be added to the same block. Embodiments of the pre-commitment process 520 are described below, with reference to FIG. 8.

After a block has been pre-committed 520, the block is ready for counting. This process is also referred to as commitment 530. Since each Validator 210 signs the block asynchronously, no assumptions can be made on when the block is ready for counting. Therefore, the Validators 210 scan for blocks for commit readiness, indicated by the number of pre-commit signatures for a block exceeding a pre-commit threshold. In embodiments using Byzantine fault tolerance, if the number of pre-commit signatures for a block is at least (⅔+1) of the number of Validators 210, the block is determined to be ready for the commit process 530. In other embodiments, other validation thresholds may be used.

In various embodiments, counting involves signature verification. Each pre-commit signature is validated using the corresponding verification key and, if the validation succeeds, the Validator 210 signs the block for commitment with a commit signature and commit verification key. The commit is conditional if the pre-commit signature is conditional and unconditional otherwise. A block is committed to the blockchain if the number of commit signatures exceeds a commit threshold (e.g., two thirds of the total number of Validators 210). The latest committed block is the head of the hardened chain. The transactions included up to and including this block are considered finalized. Embodiments of the commitment process 530 are described below, with reference to FIG. 9.

Periodically, the committed blocks starting from the previous sealed block are sealed 540. The sealing process 540 includes double checking the unsealed blocks for protocol adherence and validator bad behavior to determine their eligibility for slashing. Sealing 540 considers a batch of recently committed blocks. The batch size may be determined based on the rate of incoming transactions or it can be a static value (e.g., ten blocks). The sealing process 540 facilitates creation of blockchain checkpoints. These checkpoints indicate the block up to which the Validators 210 performed extensive auditing for protocol violation. Since the blocks contain the signatures of the Validators 210 at different stages of hardening, it is possible to identify misbehaving nodes. In some embodiments, it is also possible to compute global trust values of the participating Validators 210 based on how well behaved they are in terms of following protocol rules. These global trust values can be published as a deterrent to discourage misbehaviors.

In various embodiments, the sealing process 540 performs the stages of validation again. The sealing process 540 may also include additional tests for protocol violations. The sealing process may be run sequentially on all committed blocks since the last sealed block and hence may be slower than the pre-commit 520 and commit 530 processes. However, the sealing stage may be run asynchronously to avoid affecting blockchain throughput or transaction finalization. A sealed block serves as a checkpoint and the blocks committed after the sealed block are linked to it, as described previously with reference to FIG. 4A. In one embodiment, blocks are linked to both the immediately preceding block and the previous sealed block. This dual linking can make the blockchain more tamper resistant than traditional blockchains.

The sealing stage identifies blocks where transactions failed due to an invalid signature. The signature validation failure is most likely due to malicious signing practice. So, the offending validator may be evaluated for slashing or other disciplinary action. Sealing a block may also automatically seal all the transactions up to and including that block. As described previously, the last of the sealed transactions in an account may be used as the basis for efficiently determining the statuses of pending transactions in the account.

Figure 6:
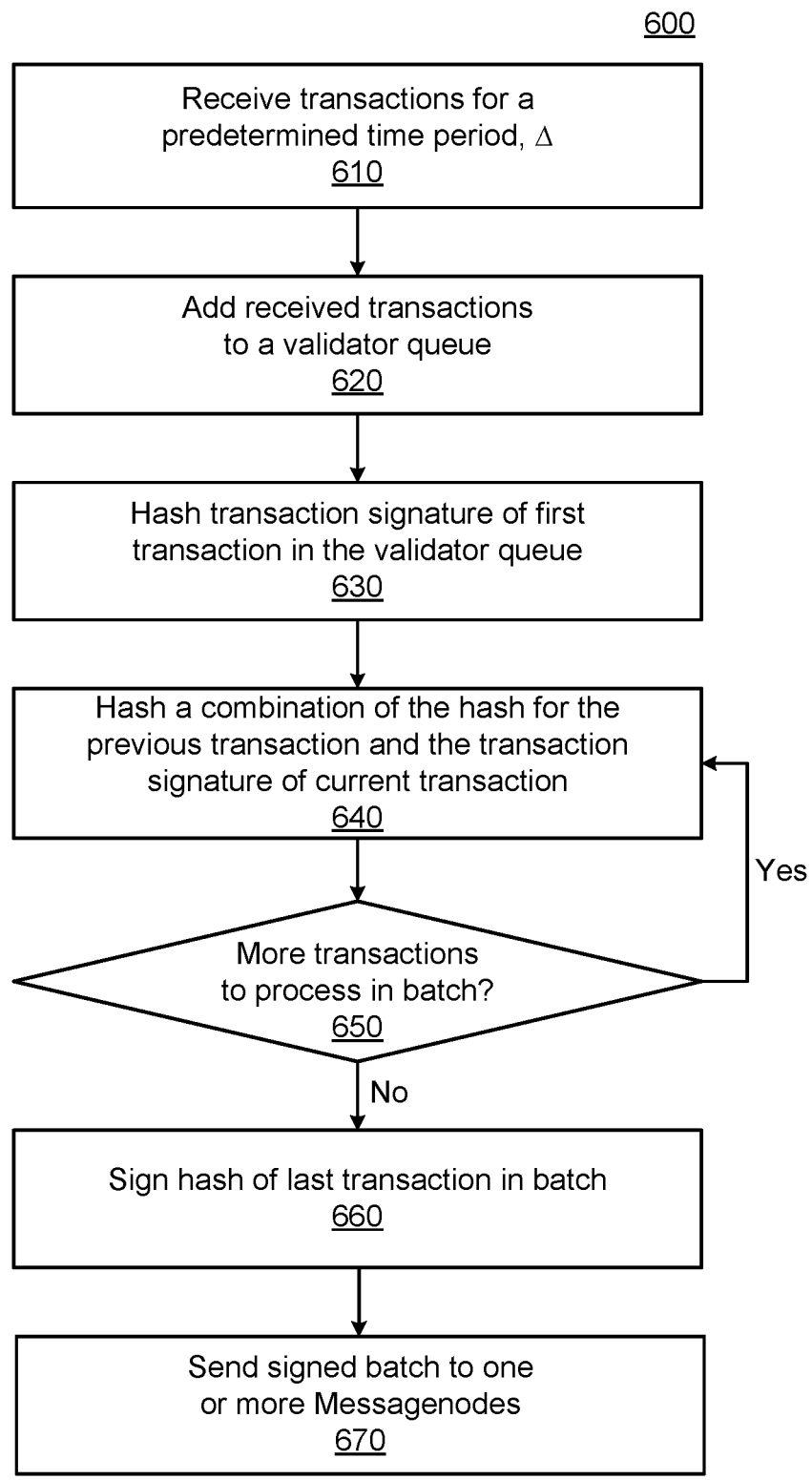
FIG. 6 is a flowchart illustrating a method for a Validator to batch transactions, according to one example embodiment.

FIG. 6 illustrates a method 600 for batching transactions, according to one embodiment. In the embodiment shown in FIG. 6, an example method 600 begins with a Validator 210 receiving 610 transactions for a predetermined time period, A. The Validator 210 may use a protocol-defined default value for A a choose a custom value based on a typical or expected rate of incoming transaction messages. The Validator 210 adds 620 the received transaction messages to a validator queue. Any previously received transaction messages that have not yet been batched may remain in the validator queue ahead of the newly added transaction messages.

The Validator 210 hashes 630 transaction signature of the first transaction message in the queue, appends the hash to the first transaction message, and adds the first transaction message as the first transaction in a new batch. The Validator 210 then proceeds to the next transaction message in the queue (now the current transaction message) and hashes 640 a combination of the hash generated from the previous transaction message and the transaction signature of the current transaction message. The combination may be obtained by concatenating the hash of the previous transaction message and the transaction signature of the current transaction message or any other suitable method. Regardless, the resulting hash is appended to the current transaction message and the current transaction message is added to the batch.

The Validator 210 determines 650 whether there are more transaction messages to process in the batch. In one embodiment, the Validator 210 determines 650 there is another transaction message to process if there is at least one more transaction message in the queue and the size of the batch has not reached a batch size threshold. Otherwise, the Validator 210 determines 650 there are not more transaction messages to process in the batch.

If the Validator 210 determines 650 there are more transaction messages to process, the method 600 returns to 640 and the Validator generates another hash, appends it to the corresponding transaction message, and adds that transaction message to the batch. At some point, the Validator 210 determines 650 that there are not more transaction messages to process and signs 660 the hash of the last transaction message in the batch (e.g., by applying its private key to the hash of the last transaction in the batch to generate an additional hash and appending the additional hash to the last transaction message in the batch). This serves as the Validator's signature for the entire batch. The Validator 210 sends 670 the completed batch to one or more connected Messagenodes 220.

Figure 7:
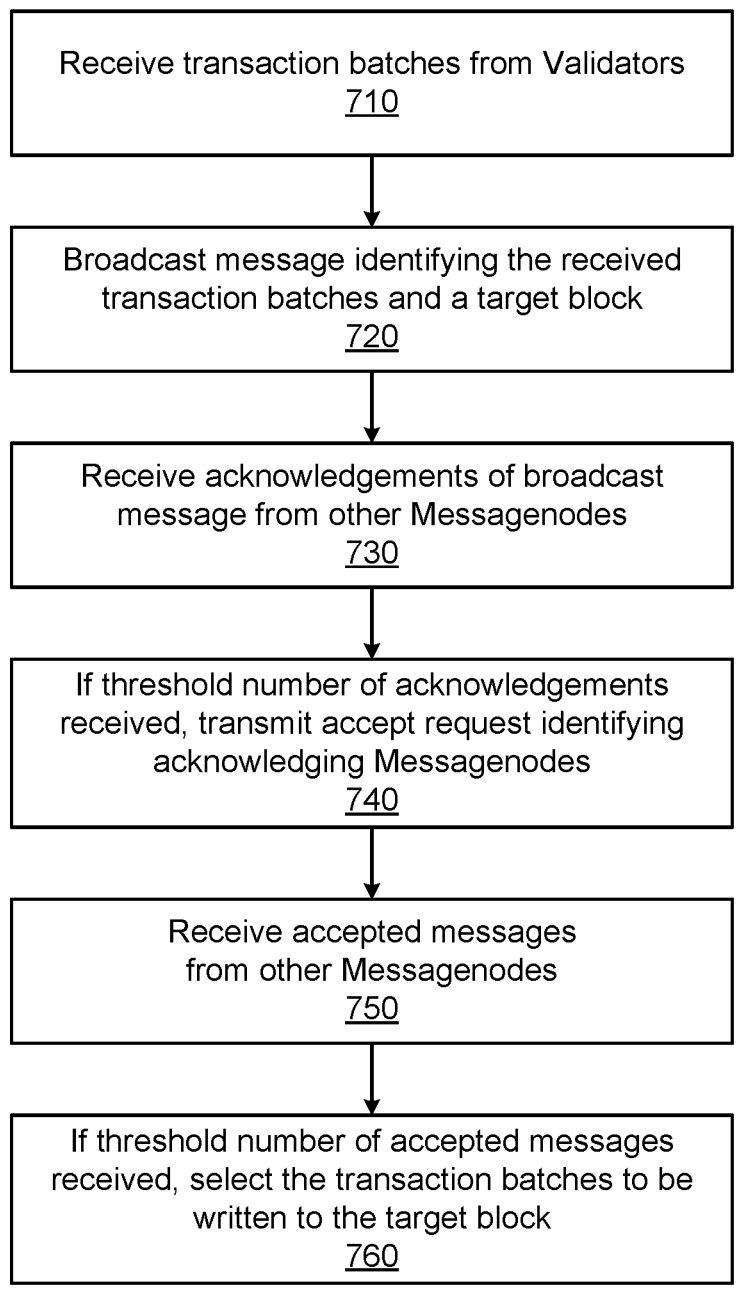
FIG. 7 is a flowchart illustrating a leaderless method for Messagenodes to reach consensus, according to one example embodiment.

FIG. 7 illustrates an example method 700 for Messagenodes 220 to reach consensus regarding received batches, according to one embodiment. In the example embodiment shown in FIG. 7, the method 700 begins with a Messagenode 220 receiving 710 transaction batches from the connected Validators 210. The Messagenode 220 broadcasts 720 a message (e.g., to all the other Messagenodes). The broadcast message identifies a target block (e.g., the next empty block), includes a list of transaction batches to add to the target block, and is signed by the Messagenode 220. Other Messagenodes 220 that receive the broadcast message send an acknowledgment back to the originating Messagenode. Assuming there are no network errors or other problems, the originating Messagenode 220 receives 730 acknowledgments from other Messagenodes.

The originating Messagenode 220 tracks the number of acknowledgements it has received and, once the number reaches an acknowledgment threshold (e.g., two-thirds of the total number of Messagenodes when using Byzantine fault tolerance), transmits 740 an accept request to the other Messagenodes. The accept request identifies the Messagenodes 220 that have acknowledged the message. In one embodiment, the originating Messagenode tracks acknowledgments with a vector that includes an identifier of each Messagenode that has acknowledged the message and includes the vector in the accept request.

Messagenodes 220 that receive the accept request check that it is valid (e.g., it identifies at least the threshold number of Messagenodes as having acknowledged the message) and, assuming it is, send an acceptance message back to the originating Messagenode. If a Messagenode 220 has not yet acknowledged the message, it may also send an acknowledgement to the originating Messagenode. Assuming there are no network errors or other problems, the originating Messagenode 220 receives 750 the accepted messages from other Messagenodes.

The originating Messagenode 220 tracks the number of accepted messages received. Once the number reaches an acceptance threshold, the originating Messagenode 220 selects the transaction batches to be written to the target block. In one embodiment, in which Byzantine fault tolerance is used, the acceptance threshold is 2f+1 acceptances, where f is the maximum number of faulty Messagenodes that may present.

Note that although FIG. 7 described the method 700 as being performed by a single Messagenode 220, in practice, the method 700 is performed in parallel by multiple Messagenodes (e.g., all of the Messagenodes). In this way, the Messagenodes 220 reach consensus regarding what transaction messages to include in the target block.

Since the Validators 210 may send transaction batches to multiple Messagenodes 220, there may be duplicate transaction batches identified for inclusion in the target block. In one embodiment, the Messagenodes 220 remove duplicate transaction batches before adding them to the target block.

Figure 8:
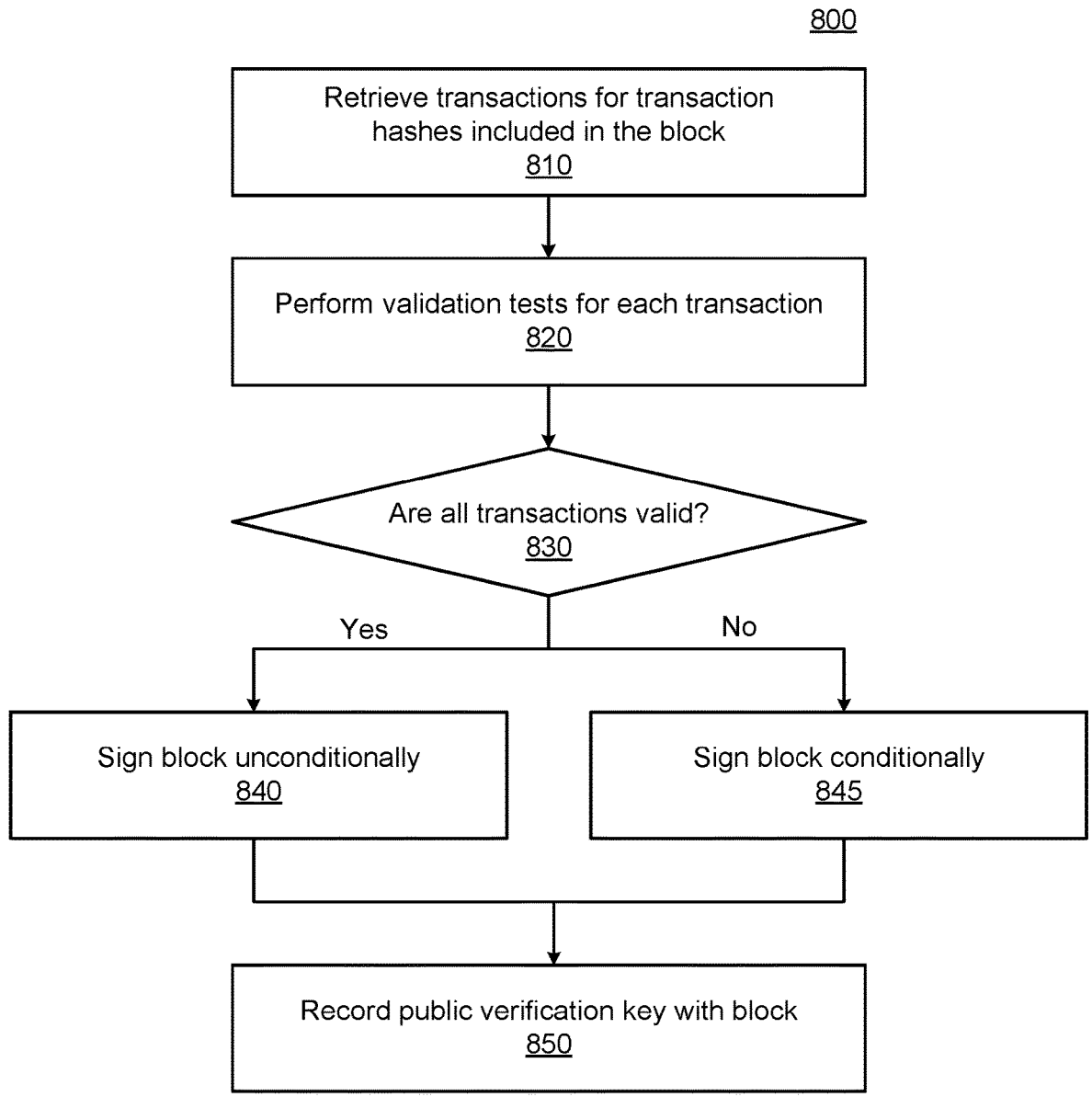
FIG. 8 is a flowchart illustrating a method for a Validator to sign a block in a pre-commit phase, according to one example embodiment.

FIG. 8 illustrates an example method 800 for signing a block in a pre-commit phase, according to one embodiment. In the example embodiment shown in FIG. 8, the method 800 begins with the Validator 210 retrieving 810 the transactions for transaction hashes included in the block. For example, using the transaction hashes included in the block, the Validator 210 can identify the corresponding transaction details in senders' accounts.

The Validator 210 perform 820 validation tests for each transaction. In one embodiment, the validation tests for a transaction include: validating that the transaction signer is an authorized Validator 210, validating the signature of the transaction signer, confirming the target block identified in the transaction matches the current block being assembled, confirming the sealed block to which the transaction is linked is valid, and checking the new balance and state of the transaction are computed correctly. If the transaction passes all of the tests, the Validator 210 sets the transaction state to valid. If any of the tests fail, the Validator 210 sets the transaction state to a failure state. In one embodiment, there are two failure states: invalid signature and invalid transaction. Invalid signature may be used if the transaction signer was not an authorized Validator 210 or the signature was invalid. Invalid transaction may be used otherwise.

The Validator 210 checks 830 whether all of the transactions in the block were valid, meaning they passed all of the tests. If so, the Validator signs 840 the block unconditionally in the pre-commit phase. If one or more transactions are not valid, meaning they failed one or more tests, the Validator 210 signs 845 the block conditionally. When signing 845 the block conditionally, the Validator 210 may also include an indication of which transactions failed one or more of the tests. The Validator 210 also records 850 its public verification key with the block.

Figure 9:
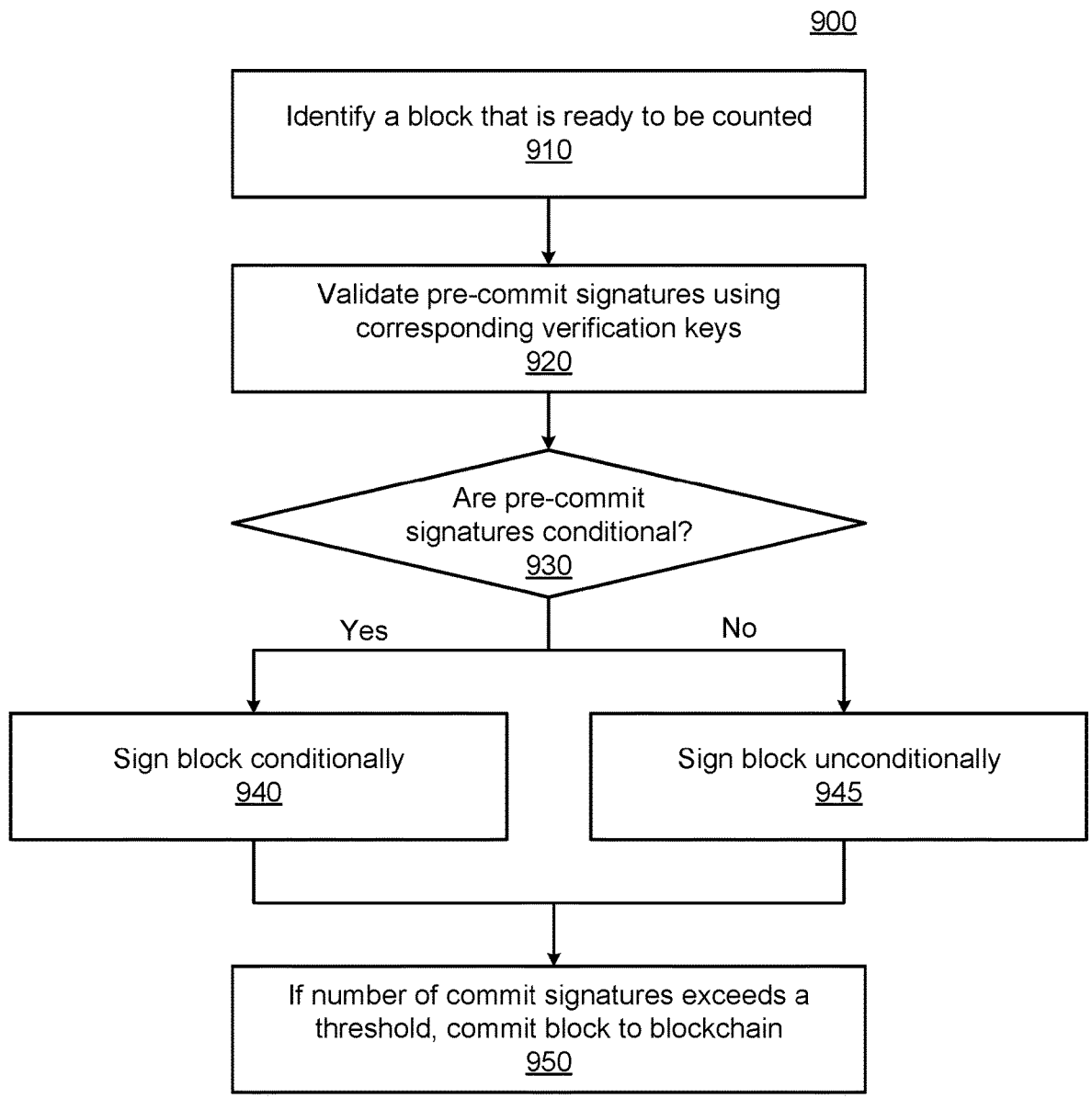
FIG. 9 is a flowchart illustrating a method for committing a block, according to one example embodiment.

FIG. 9 illustrates an example method 900 for committing a block to the blockchain, according to one embodiment. In the example embodiment shown in FIG. 9, the method 900 begins by identifying 910 a block that is ready to be counted.

A block can be identified 910 as ready to be counted by having accumulated at least pre-commit threshold number of pre-commit signatures (e.g., signatures from more than two-thirds of the total number of Validators 210). The Validators 210 may periodically check uncommitted blocks to determine whether they have accumulated the required number of signatures. The Validators 210 may do this independently and similarly proceed with the commitment phase independently. As described previously, the Validators 210 need not communicate directly to reach consensus.

The Validator 210 validates 920 each pre-commit signature using the corresponding verification key (the public key of the Validator that provided the pre-commit signature in question). Assuming sufficient pre-commit signatures are successfully validated 920 (e.g., more than two-thirds of the total number of Validators 210), the Validator determines 930 whether the pre-commit signature is conditional. If the pre-commit signature is conditional, the Validator 210 signs 940 the block conditionally. Otherwise, the Validator 945 signs the block unconditionally.

If the number of commit signatures for the block exceeds a commit threshold, the block is committed 950 to the blockchain. In other words, if a sufficient number of Validators 210 have signed the block, it is hardened. In one embodiment, where Byzantine fault tolerance is used, the commit threshold is two-thirds of the total number of Validators 210. At this stage, the block is ready for sealing, as described previously with reference to FIG. 5.

Computing System Architecture

Figure 10:
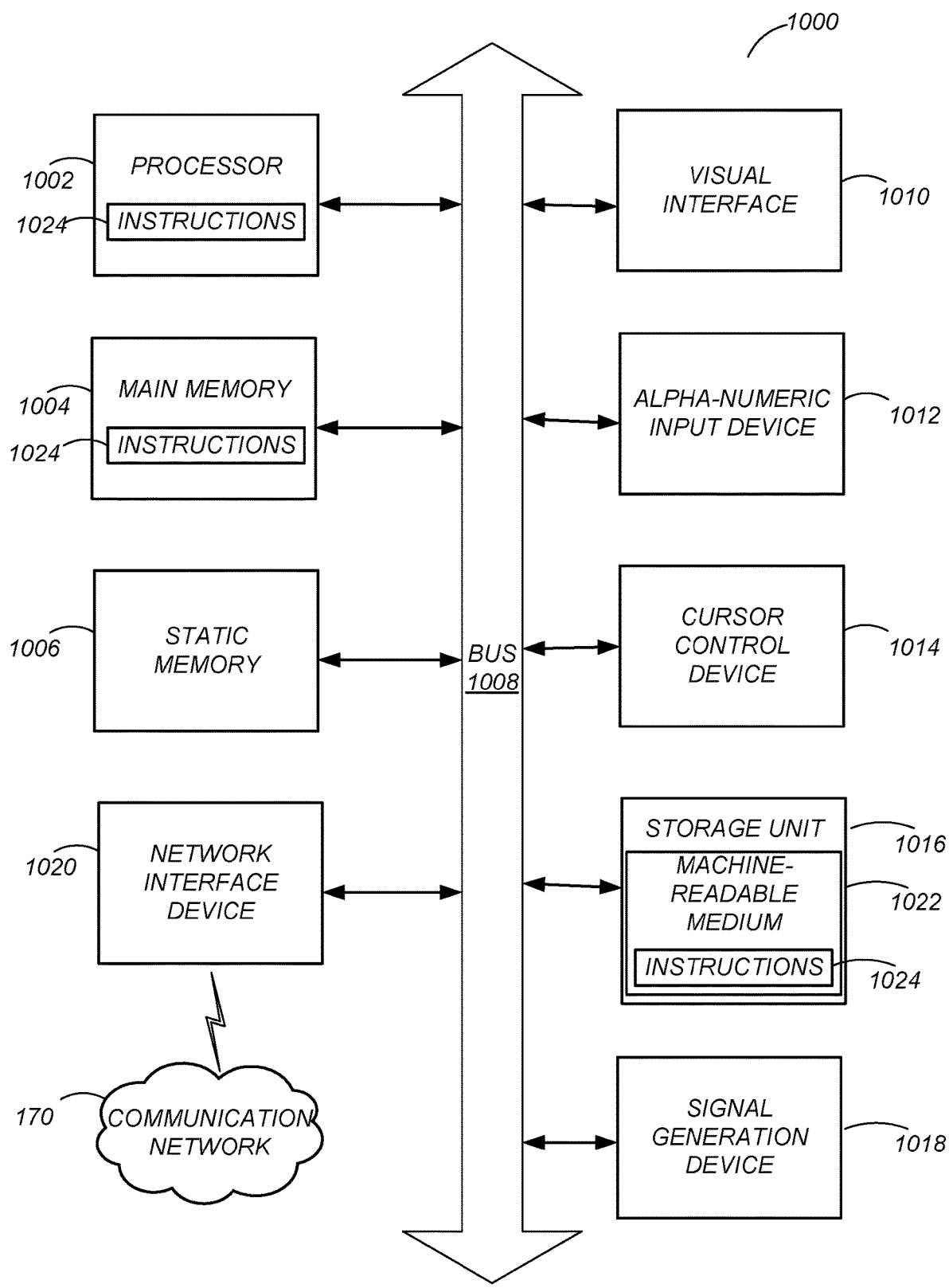
FIG. 10 a block diagram illustrating components of an example machine able to read instructions from a machine-readable medium and execute them in a processor (or controller), according to one example embodiment.

FIG. 10 is a block diagram illustrating components of an example machine 1000 able to read instructions from a machine-readable medium and execute them in a processor (or controller). Specifically, FIG. 10 shows a diagrammatic representation of a machine 1000 in the example form a computer system, within which program code (e.g., software or software modules) for causing the machine to perform any one or more of the methodologies discussed herein may be executed. The program code may be comprised of instructions 1024 executable by one or more processors 1002. The program code may correspond with the functionality and/or processes described with FIGS. 1-9. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment.

The machine 1000 may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 10224 (sequential or otherwise) that specify actions to be taken by that machine. Further, while only a single machine 1000 is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include visual display interface 1010. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1010 may include or may interface with a touch enabled screen. The computer system 1000 may also include alphanumeric input device 1012 (e.g., a keyboard or touch screen keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a communication network 170 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across one or more machines, e.g. computer system 1100. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. It should be noted that where an operation is described as performed by "a processor," this should be construed to also include the process being performed by more than one processor. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing financial transactions using a distributed ledger through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method of processing transaction messages in a consensus network, the method comprising:
   receiving, at a Messagenode of the consensus network, a plurality of transaction batches;
   broadcasting, by the Messagenode, a message identifying the received transaction batches and a target block in a distributed ledger;

receiving, at the Messagenode, a number of acknowledgments of the message by other Messagenodes of the consensus network;

transmitting, by the Messagenode and responsive to the number of acknowledgments exceeding an acknowledgment threshold, an accept request;

receiving, at the Messagenode, a number of accepted messages from other Messagenodes of the consensus network; and selecting, responsive to the number of accepted messages exceeding an acceptance threshold, the plurality of transaction batches to be written to the target block.

2. The computer-implemented method of claim 1, wherein the plurality of transaction batches each include a single transaction message.

3. The computer-implemented method of claim 1, wherein a transaction batch of the plurality of transaction batches includes a plurality of transaction messages received by a validation node in time period of predetermined length.

4. The method of claim 1, wherein the broadcasted message includes a vector comprising an identifier of each transaction batch.

5. The method of claim 1, wherein the acknowledgment threshold is two-thirds of a total number of Messagenodes in the consensus network.

6. The method of claim 1, wherein the accept request includes an identifier of each of the other Messagenodes that acknowledged the message.

7. The method of claim 1, wherein the acceptance threshold is defined as 2f+1, where f is a maximum allowable number of faulty Messagenodes.

8. The method of claim 1, further comprising:
removing duplicate transaction batches of the plurality of transaction batches to obtain one or more deduplicated transaction batches; and
writing the deduplicated transaction batches to the target block.

9. The method of claim 1, wherein the target block is an empty block built at a time before receiving of the plurality of transaction batches.

10. The method of claim 1, wherein the distributed ledger comprises a blockchain and the target block is a block of the blockchain.

11. A non-transitory computer-readable medium comprising instructions that, when executed by a Messagenode of a consensus network, cause the Messagenode to:
receive a plurality of transaction batches;
broadcast a message identifying the received transaction batches and a target block in a distributed ledger;
receive a number of acknowledgments of the message by other Messagenodes of the consensus network;
transmit, responsive to the number of acknowledgments exceeding an acknowledgment threshold, an accept request;
receive a number of accepted messages from other Messagenodes of the consensus network; and
select, responsive to the number of accepted messages exceeding an acceptance threshold, the plurality of transaction batches to be written to the target block.

12. The non-transitory computer-readable medium of claim 11, wherein the plurality of transaction batches each include a single transaction message.

13. The non-transitory computer-readable medium of claim 11, wherein a transaction batch of the plurality of transaction batches includes a plurality of transaction messages received by a validation node in time period of predetermined length.

14. The non-transitory computer-readable medium of claim 11, wherein the broadcasted message includes a vector comprising an identifier of each transaction batch.

15. The non-transitory computer-readable medium of claim 11, wherein the acknowledgment threshold is two-thirds of a total number of Messagenodes in the consensus network.

16. The non-transitory computer-readable medium of claim 11, wherein the accept request includes an identifier of each of the other Messagenodes that acknowledged the message.

17. The non-transitory computer-readable medium of claim 11, wherein the acceptance threshold is defined as 2f+1, where f is a maximum allowable number of faulty Messagenodes.

18. The non-transitory computer-readable medium of claim 11, wherein the instructions further cause the Messagenode to:
remove duplicate transaction batches of the plurality of transaction batches to obtain one or more deduplicated transaction batches; and
writing the deduplicated transaction batches to the target block.

19. The non-transitory computer-readable medium of claim 11, wherein the distributed ledger comprises a blockchain and the target block is an empty block of the blockchain built at a time before receiving of the plurality of transaction batches.

20. A Messagenode in a consensus network, the Messagenode comprising:
a processor; and
a memory storing instructions that, when executed by the processor, cause the Messagenode to:
receive a plurality of transaction batches;
broadcast a message identifying the received transaction batches and a target block in a distributed ledger;
receive a number of acknowledgments of the message by other Messagenodes of the consensus network;
transmit, responsive to the number of acknowledgments exceeding an acknowledgment threshold, an accept request;
receive a number of accepted messages from other Messagenodes of the consensus network; and
select, responsive to the number of accepted messages exceeding an acceptance threshold, the plurality of transaction batches to be written to the target block.

* * * * *